United States Patent Office
3,071,551
Patented Jan. 1, 1963

3,071,551
HIGH TEMPERATURE REGENERATION OF RHODIUM CATALYST
Ralph M. Robinson and Le Roy McKeage, Waukegan, Ill., assignors to Abbott Laboratories, North Chicago, Ill., a corporation of Illinois
No Drawing. Filed Mar. 28, 1960, Ser. No. 17,751
3 Claims. (Cl. 252—411)

The present invention relates to the regeneration of a rhodium catalyst. More particularly, it is concerned with the regeneration of a rhodium catalyst poisoned during the hydrogenation reaction of aromatic compounds to cycloaliphatic compounds.

The hydrogenation of aromatic compounds to the corresponding cycloaliphatic compound has been a standard process in the production of organic compounds containing the cyclohexyl radical. In the past, a number of catalysts have been used for this reaction, most of them requiring high pressures, high temperatures, or both, and quite frequently producing yields unacceptable for economical operations. In recent years, a new catalyst has been introduced to accelerate the hydrogen uptake in aromatic compounds. This newer catalyst rhodium, has been found very valuable for the hydrogenation of a number of aromatic compounds to the corresponding cyclohexyl compounds, since this catalyst produces high yields of the cyclohexyl compound in relatively short times, at low pressures, and at low temperatures. For example, aniline has been found to be reducible to cyclohexylamine in the presence of rhodium at temperatures below 100° C. and at pressures acceptable for such low pressure apparatus as a still, a Parr shaker, or similar equipment.

Although the rhodium catalyst was found to be of extreme importance in the reduction or hydrogenation of aromatic compounds, it is also sensitive to the so-called catalyst poisons which exist in practically all aromatic compounds. Even when purified starting materials are used it is found that successive hydrogenations carried out with such a rhodium catalyst may poison this catalyst and succeeding batches of the same starting material will not hydrogenate within the same time period in which the original batches had been hydrogenated. Very often it is found that the second hydrogenation reaction can not be carried out without removal of the catalyst poisons accumulated on the catalyst or within the catalyst during the first hydrogenation reaction.

Although rhodium catalysts have been used for many years in particular hydrogenation reactions, an acceptable method for the regeneration has not been reported; in fact no method is known for the regeneration of a rhodium catalyst used for the hydrogenation of aromatic compounds.

It is, therefore, an object of the present invention to provide a method for the regeneration of a rhodium catalyst. It is another object of the present invention to provide a method to remove catalyst poisons from a rhodium catalyst previously used in the hydrogenation reaction of aromatic compounds to cyclohexyl compounds. Other objects will be apparent from the following specification and the appended claims.

According to the invention, a rhodium catalyst poisoned by by-products from the hydrogenation of an aromatic compound to a cyclohexyl compound is regenerated by heating the catalyst to a temperature in excess of 100° C. for a period of time exceeding one hour. The rhodium catalyst referred to in the present description may be in the form of pellets, granules, or in its finely divided metallic form, or the rhodium may be supported by a carrier such as alumina, carbon, kieselguhr, zirconium oxide, bentonite, asbestos, silica gel, etc. The rhodium catalyst may be in pure form or it may be mixed with other noble metals, but at least 50% of the active catalyst metal is rhodium for the catalyst to be considered a rhodium catalyst. The by-products referred to hereinbefore are those catalyst poisons which affect the catalyst when used in the hydrogenation of aromatic compounds. The aromatic compounds referred to include basic reacting compounds such as aniline, salt-type compounds such as ammonium phenylsulfamate, and acid reacting compounds such as phenol.

The temperature necessary to regenerate the rhodium catalyst according to the present invention is a minimum of 100° C. but preferably 200° C. and above. An upper limit of the temperature range is automatically dictated by the equipment used, and for practical consideration may be set at 500° C. Operating above this temperature is of little advantage since the regeneration effect is no better but more complicated, and expensive dryers or heating devices are necessary to operate at such high temperatures. The catalyst itself, however, is fully stable at temperatures to 500° C. and above. The best and most effective temperature range for the regeneration process is from about 200° C. to about 300° C.

The heating time for the rhodium catalyst is at least one hour. An upper time limit again is dictated by practical considerations, but the most useful time period range is found to be from about 2 hours to about 24 hours of heating to the temperature desired for regeneration. Obviously, the heating time periods may be shortened by increasing the temperature and longer heating times may be desirable for regeneration processes at the lower temperatures. For example, heating a poisoned catalyst at about 250° C. for a period of 4 hours gives excellent results, but the results are equally good by heating the catalyst 12 hours or more at this temperature or at a temperature of about 200° C.

For better understanding of the present invention, the following examples are given. However, it is to be understood that these examples are illustrations only and not limiting the invention in any respect.

EXAMPLE 1

*Ammonium Cyclohexylsulfamate*

A mixture of 23 g. of ammonium phenylsulfamate, 120 cc. of deionized water, 0.5 g. of Hy-Flo (a filter-aid marketed by the Johns Manville Corp.), and 0.5 g. of Darco G–60 (an activated carbon marketed by the Atlas Powder Co.) is agitated five minutes, and filtered to remove the solids. The volume is reduced by distilling off 20 cc. of the water to remove possible traces of aniline contained in the ammonium phenylsulfamate. This clear solution is then added to 9.0 g. of 5% rhodium on alumina in a Parr shaker and the mixture is heated to a temperature of 50–55° C. at an initial hydrogen pressure of 28 p.s.i.g. The pressure is cycled between 28 and 12 p.s.i.g. by manually opening the hydrogen supply valve when the gauge pressure decreases to 12 p.s.i. and closing again at 28 p.s.i.g. After shaking and hydrogenating this ammonium phenylsulfamate solution for 84 minutes, the hydrogen uptake ceases, indicating the end of the hydrogenation. After decanting the liquid from the Parr shaker and analyzing it, an almost complete conversion of ammonium phenylsulfamate into ammonium cyclohexylsulfamate is found.

The catalyst remaining moist in the Parr shaker after decantation of the liquids therefrom is used in a second hydrogenation reaction under the identical conditions described above. However, the hydrogen uptake is found to be very slow and after 135 minutes, the reaction is interrupted. The supernatant liquid is analyzed and shows less than 50% conversion into ammonium cyclohexylsulfamate.

The catalyst is removed from the Parr shaker and placed in a glass bottle. The bottle is evacuated and heated on a metal surface, the metal surface being kept for 3 hours at 230–235° C. After this regeneration of the catalyst, it is placed in the Parr shaker once more and another batch of ammonium phenylsulfamate is hydrogenated under the conditions described above. The pressure drop levels off within 98 minutes and the analyzed liquids show a complete conversion of ammonium phenylsulfamate into ammonium cyclohexylsulfamate.

The catalyst is regenerated again as described above but by heating it on the metal surface to 230–235° C. for 4 hours. In a repetition of the above described hydrogenation reaction under the identical conditions, complete conversion of the ammonium phenylsulfamate into the corresponding cyclohexyl compound is observed within 90 minutes.

EXAMPLE 2

*Cyclohexylamine*

(a) In a similar reaction to the one described in Example 1, aniline is hydrogenated with a catalyst mixture containing 50% of 5% rhodium on alumina and 50% Hy-Flo. After using the catalyst for several batch hydrogenations of aniline to cyclohexylamine without ever exposing it to air or oxygen, its catalytic activity reduces due to catalyst poisons. As a consequence, a hydrogenation with such a poisoned catalyst can not take place or will require a much longer hydrogenation time under otherwise identical conditions. Of such an inactivated catalyst, 2 g. are mixed with 50 cc. of aniline and hydrogenated in a Parr shaker while preheating the reaction mixture to 70° C. and with an initial pressure of 58 p.s.i.g. of hydrogen pressure. Due to the exothermicity of the reaction, very little heat is required to maintain a temperature around 90–100° C. during the hydrogenation reaction. After 13 hours, the cycling pressure drop ceases with a hydrogen uptake of 34.5% of theory. The reaction is interrupted and the reaction mixture is analyzed showing 69.1% of the unconverted aniline and about 29% of cyclohexylamine.

(b) The catalyst is then removed and heated in a vacuum oven to 110° C. for three hours. The above hydrogenation reaction is then repeated with this regenerated catalyst and a new batch of aniline under otherwise identical conditions. Within 15 hours, the cycling pressure ceases, showing a hydrogen uptake of 67.5%, while a maximum temperature of 98° C. is observed during the whole reaction period. Analysis of the reaction mixture shows 34.8% unconverted aniline and 56.8% of cyclohexylamine.

(c) In a similar reaction, the inactivated catalyst is regenerated by heating it for 16 hours to a temperature of 192° C. in a vacuum oven. Reducing 50 cc. of aniline with 2 g. of this catalyst under otherwise identical conditions, the hydrogen pressure is manually cycled within the limits of from 58 to 32 p.s.i.g. After 16 hours and 20 minutes, the hydrogen uptake becomes uneconomical and the reaction is terminated. A hydrogen uptake of 81.5% is observed with a maximum reaction temperature of 101.3° C. Analysis of reaction mixture shows 22.9% unconverted aniline and 68.5% of cyclohexylamine.

(d) In another regeneration process, the catalyst is heated 4 hours to 300° C. in an air dryer and then used under otherwise identical conditions to reduce aniline to cyclohexylamine. After 12 hours and 15 minutes the hydrogen uptake is uneconomical and the reaction is terminated. With a maximum reaction temperature of 101.8° C., a 100% hydrogen uptake is observed. The resulting reaction mixture shows over 90% cyclohexylamine and only 1.58% unreacted aniline.

(e) For comparative reasons, another experiment is run under identical conditions but using fresh catalyst, i.e. catalyst that has not previously been used for any reaction. After 12 hours and 45 minutes, with a maximum temperature of 100.5° C. the economical hydrogen uptake ceases and a hydrogen uptake of 96% is measured. The analysis of the reaction mixture shows 91.4% cyclohexylamine.

EXAMPLE 3

*Cyclohexanol*

A catalyst consisting of 5% rhodium on alumina and having been used for several hydrogenation reactions for phenol to cyclohexanol is used. A mixture of 25 g. of phenol in 75 cc. of deionized water containing 0.5 g. of Hy-Flo is hydrogenated in a Parr shaker with 0.5 g. of the above described rhodium catalyst. After 5 hours and 20 minutes at 58 p.s.i.g. hydrogen pressure and 90.8° C. maximum temperature, no reduction is observed. The catalyst/Hy-Flo mixture is filtered, and the solids placed on a tray in an oven at 300° C. for 4 hours. After this regeneration process, the catalyst mixture is used for an identical reaction as the one described above but with a maximum temperature of 93° C. After 4.5 hours of hydrogenation, a small sample is tested to show 46.5% completion of the hydrogenation. The reaction is continued over-night and after 20 hours, the reduction shows 94% completion.

In the above examples it has been shown that the regeneration of the rhodium catalyst by the heat treatment is very effective and removes all the poisons accumulated on or within the catalyst during a hydrogenation reaction with aromatic compounds. The fact that a simple heat treatment restores the activity of the catalyst is very surprising, since all other means usually tried for catalyst regeneration fail with this rhodium catalyst. Thus, for example, washing the catalyst with 1–2% of hydrogen peroxide completely fails to restore catalyst activity and prolonged steaming or boiling the catalyst with water also is unsuccessful.

The examples also demonstrate that higher temperatures are preferred in the regeneration process for the rhodium catalyst, although temperatures of around 100° C. are useful but temperatures above 200° C. are preferred, since the activity of the catalyst is restored faster at such a temperature without any detrimental effect on the catalyst or its support, where such a support is used.

Any means of heating is acceptable for the regeneration of the rhodium catalyst activity, provided that the catalyst is not exposed to oxygen while in contact with organic, inflammable materials. Thus, the organic materials have to be washed thoroughly off the catalyst before exposing it to oxygen. Air dryers, vacuum ovens, or even open hot-plates are suitable heating means.

Others may practice the invention in any of the numerous ways which will be suggested to one skilled in the art by the present disclosure. All such practice of the invention is considered to be a part hereof provided it falls within the scope of the appended claims.

We claim:

1. The method of regenerating the activity of a rhodium catalyst poisoned by by-products from the hydrogenation of aromatic compounds to the corresponding cycloaliphatic compounds, comprising heating the catalyst in a single step to a temperature of between 100° and 300° C. for a period of at least two hours.

2. The method of claim 1 wherein the catalyst is heated to a temperature of from 200° C. to 300° C.

3. The method of claim 1 wherein the catalyst is heated for a period of from 2 hours to 24 hours.

References Cited in the file of this patent

UNITED STATES PATENTS 2,641,582    Haensel _____ June 9, 1953